Dec. 4, 1962 M. S. JOHNSON 3,066,597
COFFEE MAKER
Filed Oct. 21, 1958 3 Sheets-Sheet 1

INVENTOR.
MELVIN S. JOHNSON
BY Victor J. Evans & Co.
ATTORNEYS

Dec. 4, 1962   M. S. JOHNSON   3,066,597
COFFEE MAKER
Filed Oct. 21, 1958   3 Sheets-Sheet 2
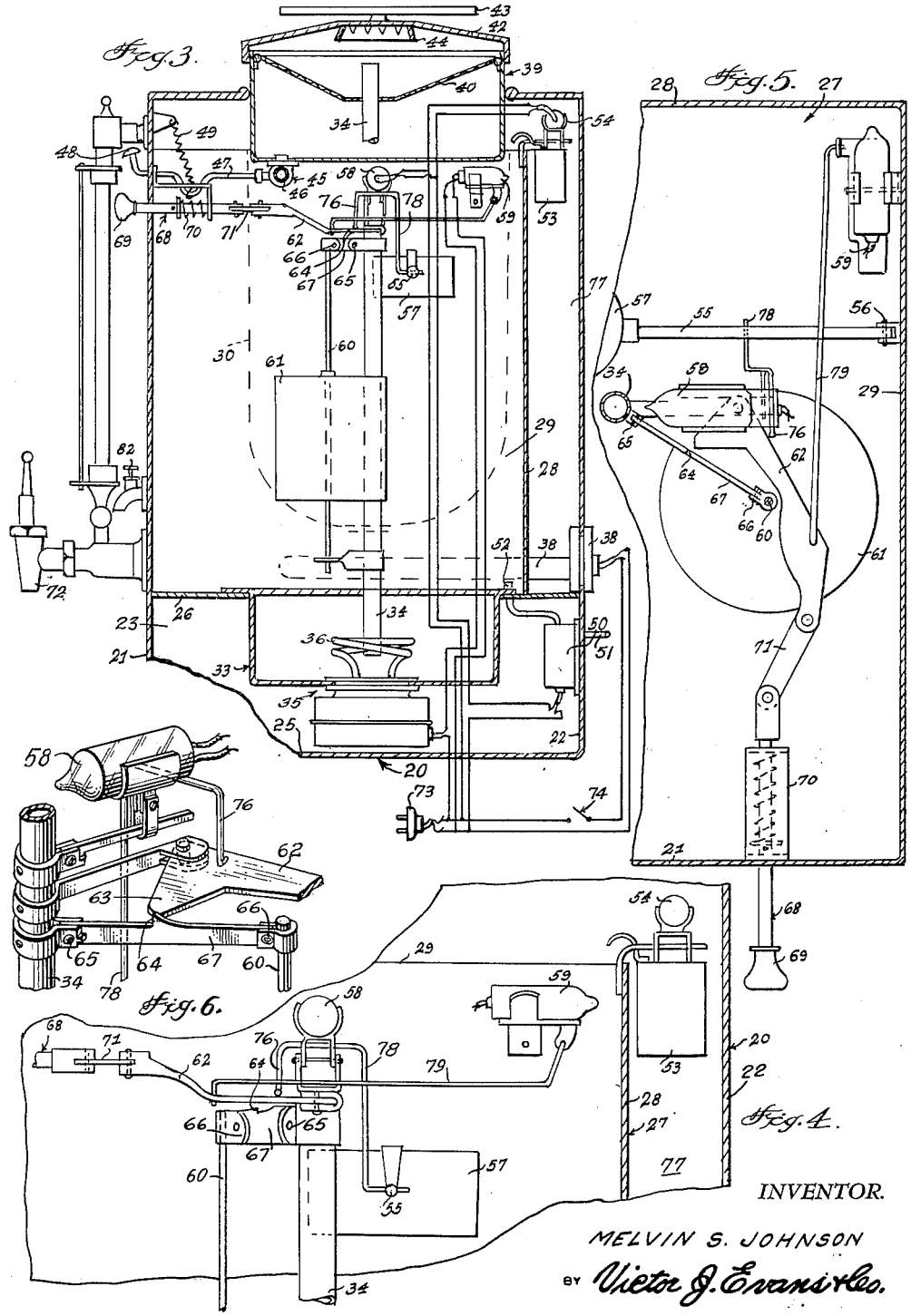
INVENTOR.
MELVIN S. JOHNSON
BY Victor J. Evans & Co.
ATTORNEYS Dec. 4, 1962    M. S. JOHNSON    3,066,597
COFFEE MAKER
Filed Oct. 21, 1958    3 Sheets-Sheet 3

INVENTOR.
MELVIN S. JOHNSON
BY
Victor J. Evans & Co.
Attorneys 3,066,597
COFFEE MAKER
Melvin S. Johnson, Pittsburgh, Pa., assignor of forty-five percent to Ralph M. Underwood, Pleasant Hills Borough, Pa., five percent to Jacob E. Kalson, and five percent to William R. Kalson, both of Mount Lebanon Township, Pa.
Filed Oct. 21, 1958, Ser. No. 768,616
1 Claim. (Cl. 99—282)

This invention relates to a coffee making machine or apparatus.

This invention is an improvement over the automatic coffee maker shown and described in my prior Patent No. 2,663,248.

The object of the invention is to provide a coffee maker which is electrically operated, and wherein a desired quantity of coffee can be automatically made without requiring close supervision of the apparatus or machine.

Another object of the invention is to provide a coffee maker which is constructed so that as water flows into the device from a suitable source of supply, a control mechanism will be set into operation wherein the proper amount of water will be percolated or heated to supply a pair of spaced apart urns with coffee, and wherein when the level of liquid or fluid decreases below a predetermined level, the heating members will be automatically actuated so that additional coffee can be made.

A further object of the invention is to provide an automatic coffee maker which is extremely simple and inexpensive to manufacture.

Other objects and advantages will be apparent during the course of the following description.

In the accompanying drawings, forming a part of this application, and in which like numerals are used to designate like parts throughout the same:

FIGURE 3 is a vertical sectional view taken at right angles to the view shown in FIGURE 1.

FIGURE 4 is a fragmentary sectional view illustrating certain constructional details of the present invention.

FIGURE 5 is a fragmentary plan view illustrating certain portions of the present invention.

FIG. 6 is an enlarged fragmentary perspective view of one of the mercury switches and the mechanism for operatively mounting the mercury switch.

Figures 1, 2:
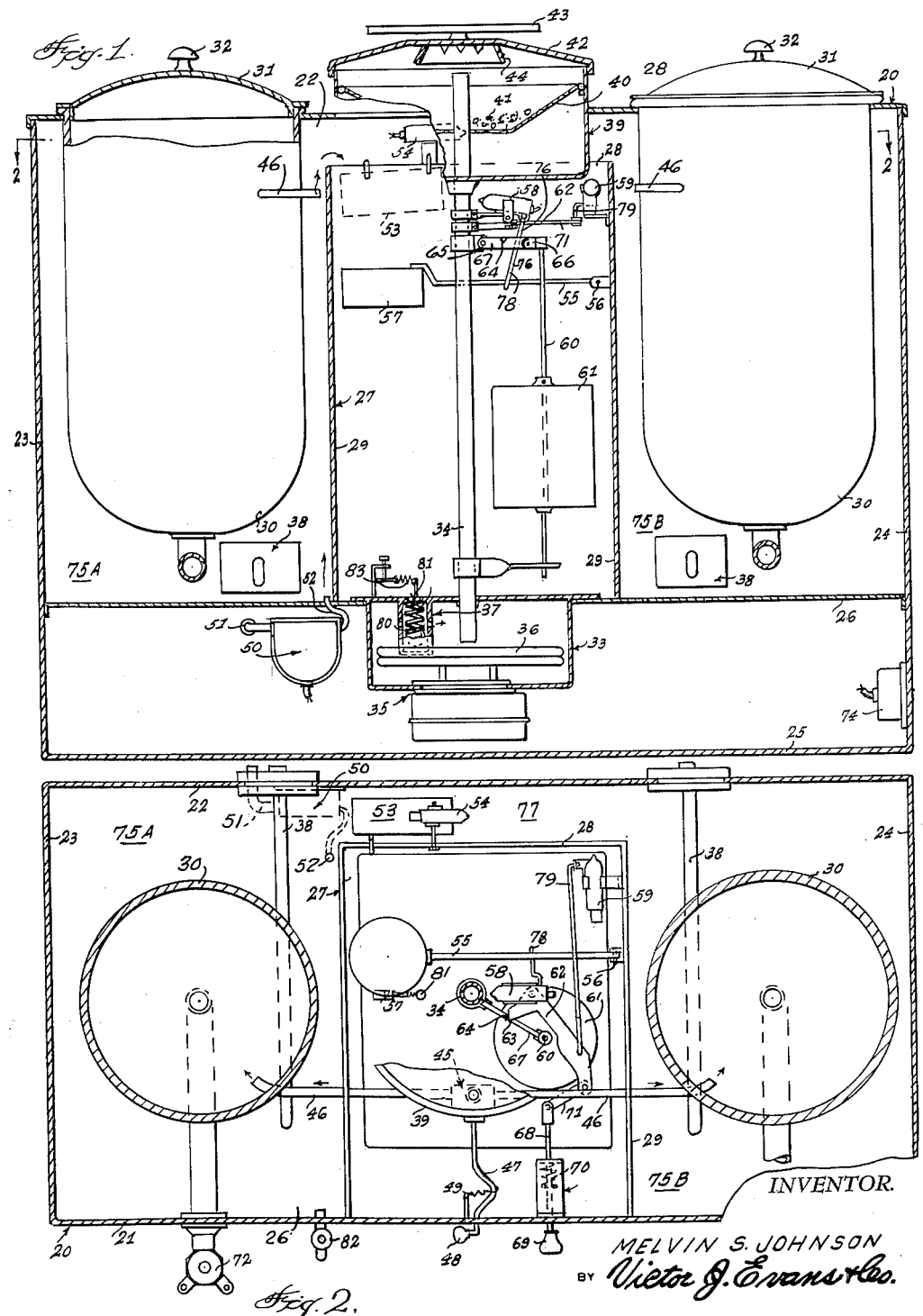
FIGURE 1 is a vertical sectional view taken through the coffee maker of the present invention.
FIGURE 2 is a horizontal sectional view taken through the coffee maker of the present invention on the line 2—2 of FIGURE 1.

Referring in detail to the drawings, the numeral 20 indicates a hollow housing which includes vertically disposed spaced parallel front and back walls 21 and 22, as well as spaced parallel vertically disposed end walls 23 and 24. The housing 20 further includes a horizontally disposed bottom wall 25, and arranged above the bottom wall 25 is a horizontally disposed platform 26.

Arranged in the housing 20 is a hollow casing 27 which includes spaced parallel vertically disposed side members 29 and a back member 28. It is to be noted that the upper end of the casing 27 is arranged below the top of the housing 20 for a purpose to be later described.

Arranged in the housing 20 on opposite sides of the casing 27 is a pair of urns 30, and each urn 30 is provided with a removable lid 31, there being a knob or handle 32 connected to each lid 31, FIGURE 1.

Mounted below the platform 26 is a hollow body member 33, and the numeral 34 indicates a vertically disposed tube which has its lower end communicating with the interior of the body member 33. A heater 35 includes a coil 36 which is arranged in the body member 33.

The numeral 37 indicates a ball valve mechanism which is arranged in the body member 33. There is further provided a pair of heaters 38 which are arranged adjacent the lower portions of the urns 30.

There is further provided a container which is indicated generally by the numeral 39, FIGURE 1, and the upper end of the tube 34 extends into the container 39. A bag 40 is arranged in the container 39, and the numeral 41 indicates coffee which is to be percolated. A lid 42 is arranged on the container 39, and a handle 43 is provided for raising the lid 42, as for example when coffee is to be placed in the container 39. A deflector or baffle 44 is supported by the lid 42 so that the water which passes up through the tube 34 will be deflected down onto the coffee 41 which is being percolated.

A conduit means is provided for conveying material from the container 39 to the urns 30, and this conduit means comprises a pair of oppositely extending conduits 46 which extend between the urns 30 and a valve 45, FIGURE 2, the valve 45 having an inlet in the container 39. A lever 47 is provided for operating the valve 45, and a knob 48 is connected to the lever 47 for facilitating the manual movement thereof, there being a spring 49 connected to the lever 47. Thus, by properly moving the lever 47, coffee can be permitted to flow through either of the pair of conduits 46 into either of the pair of urns 30, or else the lever 47 can be positioned in such a manner that the valve 45 is entirely closed off, so that no coffee will flow through the conduit 46.

There is further provided a solenoid valve 50 which is adapted to be connected to a suitable source of supply of water through the medium of a conduit 51, and the numeral 52 indicates a conduit or line which leads from the solenoid valve 50 to the interior of the housing 20.

Arranged in the housing 20 adjacent the rear portion thereof and positioned behind the casing 27 is a first float 53 which carries a first mercury switch 54.

A float 57 is connected to an end of a bar 55, and the bar 55 is pivotally connected to a side member 29 of the casing 27 as at 56. The numeral 58 indicates a mercury switch which is actuated by the float 57 as later described in this application.

There is further provided a mercury switch 59, and the numeral 60 indicates a vertically movable rod which is shiftably mounted in the casing 27. A float 61 is secured to the rod 60 in any suitable manner.

The numeral 62 indicates a trigger which is provided with a shoulder 63 that is adapted to selectively engage a notch 64 formed on an arm 67, and one end of the arm 67 is pivotally connected to the tube 34 as at 65, while the other end of the arm 67 is pivotally connected to the rod 60 as at 66, FIGURE 5.

The numeral 68 indicates a push-pull rod which has a knob 69 on its outer end, and a spring 70 mounted on rod 68 in circumjacent relation thereto urges the rod 68 outwardly of the front wall 21, there being a link 71 pivotally connecting the inner end of the rod 68 to an end of the trigger 62.

The numeral 72 designates each of a pair of dispensing faucets, and the numeral 73 indicates a plug which is adapted to be connected to a suitable source of electrical energy.

Figure 8:
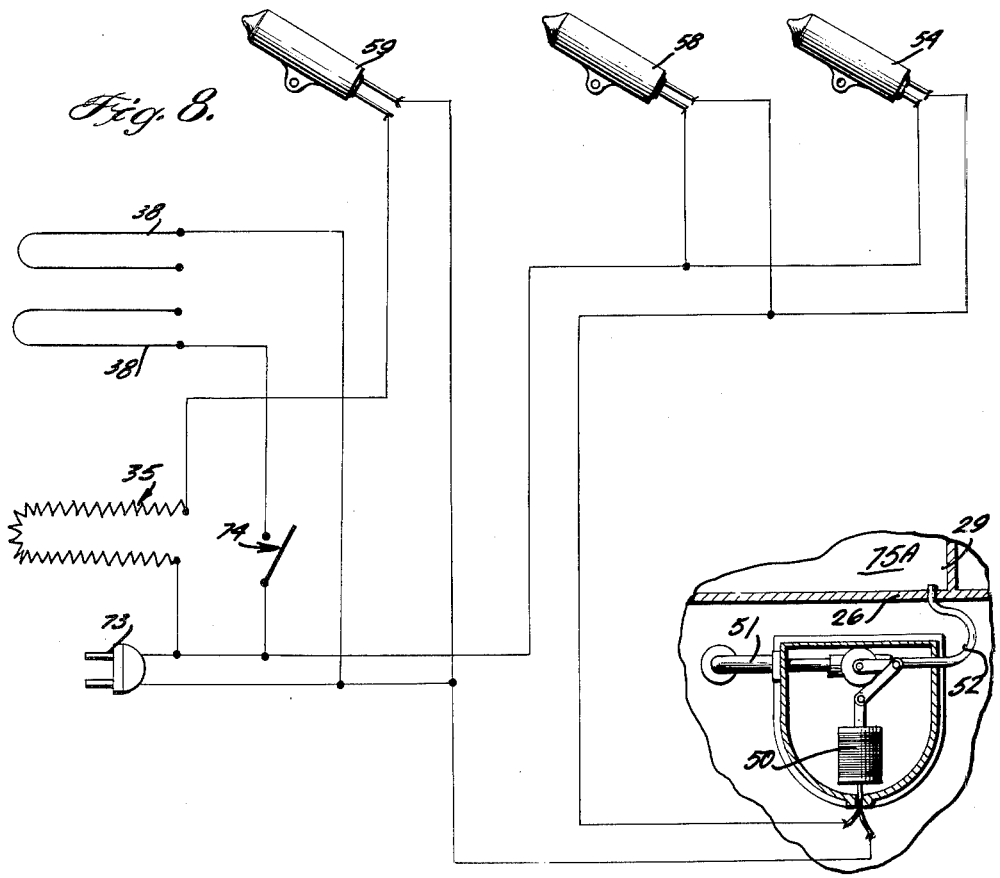
FIGURE 8 is a diagrammatic view showing the electrical circuit embodied in the invention with the mercury switches in the circuit shown in elevation and with an enlarged detailed fragmentary sectional view of the solenoid valve of FIGURE 3 included therein.
Figure 7:
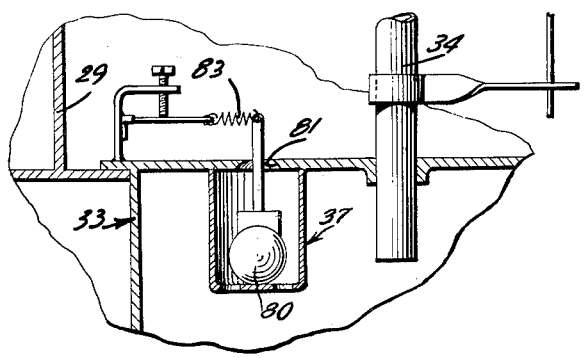
FIGURE 7 is an enlarged detailed fragmentary sectional view of the ball valve assembly shown in FIGURE 1.

The operation of the improved automatic float coffee maker is as follows. The solenoid valve 50 is wired to the mercury switches 58 and 54 which are wired directly to the electric inlet. The switches 54 and 58 are connected by wires in parallel relation to each other and are connected by wires to the solenoid valve 50 and a plug 73 for connection to the electrical supply line as shown in FIGURE 8. The mercury switch 59 serves to operate the heating element 35, and the heating elements 38 are wired to operate through the switch 74. When the device is connected to the water supply, it is only necessary to plug into the electric line, as for example by means of the plug 73. The mercury switches 58 and 54 are in "on" or closed position so as to actuate the solenoid valve 50 which causes it to open and permit water to flow into the compartments 75A and 75B. The switch 74 is at "off" position at this time.

When water has filled the compartments 75A and 75B, it spills over into the compartment or casing 27 until it reaches the float 57. The float 57 is positioned to actuate the mercury switch 58 by means of a link 78 of a rod 76 as shown in FIGS. 1 and 6 the link 78 is connected to the bar 55 that is connected to the float 57 so that as the float rises the link 78 will push the rod 76 upwardly to move the switch 58 as shown in FIGURE 6. When the float 57 rises therefor, it pushes the mercury switch 58 by means of the link 78 and rod 76 to "off" or open position so as to stop the water flow from the solenoid valve 50. The mercury switch 54 has already been pushed to "off" or open position when the water jackets 75A and 75B fill and will stay inactive until water is drained from the jackets 75A and 75B as for example when tea is being made or when rinsing, at which time the float 53 drops so as to close the mercury switch 54 whereby the water jackets 75A and 75B will be refilled. As shown in FIGURE 2, the jackets 75A and 75B are connected in the rear of the device through the medium of the space or passageway 77.

When the housing is full, the switch 74 is turned on to start the pair of heating elements 38. When the water has been heated to the proper temperature by the thermostatically controlled elements 38, all water in the housing will be at the same temperature.

When coffee is being made, the operator places a cloth coffee strainer bag 40 in the spray chamber or container 39 and then places a predetermined amount of coffee grounds into the bag, the coffee being indicated by the numeral 41. Then, the operator positions the airtight lid 42 on the container 30. Next, the operator pushes in on knob 69, so that control bar or trigger 62 moves anti-clockwise as shown in FIGURE 2, which causes the toe end or shoulder 63 of the trigger 62 to engage in the notch 64 on the bracket or arm 67. The arm 67 is being pushed up by the float 61 so as to hold the toe 63 of the trigger 62 in the notch 64.

Furthermore, when the knob 69 is pushed in, it pushes the outer right side edge of the trigger 62 under the rod 76 that is integral with the link 78, and this holds the float 57 up and the mercury switch 58 at "off" or open position, as shown in FIGURE 6.

It is to be noted that there is a small rod 79, extending from the control bar or trigger 62 to the mercury switch 59. When the knob 69 is pushed in, it causes the rod to push the mercury switch 59 to closed or "on" position so as to actuate the heating element 35 in the boiler housing 33.

When water from the hollow casing 27 fills the boiler housing 33, the float ball 80 rises and seats in the hole 81. The heating element 35 causes one quart of water the capacity of the housing 33 to blow up the center tube 34 over the coffee grounds 41 in the cloth coffee strainer 40, in the spray chamber 39, so as to brew coffee which is deposited into the container 30 on the right or left of the hollow housing 27 as determined by the setting of the valve 48. This process continues until a predetermined amount of water as determined by the actuation by the operator of the knob 69 which controls the mercury switch 59 to energize the heater 35 in the body member 33 has passed over the coffee grounds.

When the quart of water has blown up the center tube 34, the float ball 80 drops and this process repeats until the water level in the container 27 drops down to the float 61 which causes the float 61 to drop so as to disengage the toe 63 of the control bar 62 from the notch 64 in the arm 67. The release spring 70 pulls the edge of the control bar 62 from under the leg of the rod 78 which permits the float 57 to drop. This pulls the mercury switch 58 to "on" or closed position which actuates the solenoid valve 50 to refill the device and as the device fills, it raises the float 57 as previously described.

The heating elements 38 continue to heat water for the next batch.

The device is provided with three faucets on the front, two of the faucets being indicated by the numeral 72 that are used to dispense the contents from the containers 30, and the other faucet being indicated by the numeral 82 so that the hot water can be readily dispensed to make hot tea or for other purposes. The device may also be provided with glass tubes for indicating the amount of coffee in the urns 30. The intermediate faucet 82 does not drain from the center compartment 27, but a tube leads from the intermediate faucet 82 and extends through a wall of the casing 27 to drain from the water jacket 75A or 75B.

A spring 83 serves to regulate the amount of water that blows up the center tube 34. Thus, the more tension the spring 83 has on the ball 80, the more water will escape around the ball and out through the hole 81 before the steam pressure seats the ball, and it also makes the ball drop quicker after the water has been expelled from the boiler housing 33. The tension of the spring 83 temporarily prevents the ball 80 from seating on its seat or opening 81, and permits a certain amount of water to come through the opening 81 into the compartment or hollow body member 33 until there is sufficient pressure for the ball valve 80 to compress the spring 83 whereby the ball valve can then prevent any further supply of water into the compartment 33 until the pressure again lets the ball valve 80 drop down and permit additional water into the compartment 33. The tension of the spring 83 regulates the amount of water entering the compartment 33.

From the foregoing, it is apparent that there has been provided an automatic coffee maker and in use water from a suitable source of supply is discharged into the housing as previously described, and this water passes through the solenoid valve 50 when the solenoid valve 50 is open. This water flows into the housing until it overflows into the casing 27 and when the water reaches a predetermined level, the various floats will move so as to actuate the corresponding mercury switches so that the electrical circuits can be selectively completed or opened. These electrical circuits serve to operate the solenoid valve as well as the heating elements so that a means is provided for preventing overflow of water and wherein a means is provided for maintaining the water and coffee at the proper temperature.

The water is forced up through the tube 34 and this water engages the coffee 41 in the container 39, and the valve mechanism spring 83 can be used as a control or adjusting feature. The hot coffee can be drained out from either of the urns 30 by means of faucets 72. The valve or faucet 82 can be used for supplying hot water for any desired purpose.

The device is adapted to operate automatically so that by properly setting the controls, coffee will be brewed and discharged into the urns 30 and then the device will shut itself off and refill with water for the next batch of coffee.

Minor changes in shape, size and rearrangement of details coming within the field of invention claimed may be resorted to in actual practice, if desired.

I claim:

In a coffee maker, a hollow housing including vertically disposed front and back walls, spaced parallel vertically disposed end walls, and a horizontally disposed bottom wall, a horizontally disposed platform arranged in said housing above said bottom wall, a casing arranged in said housing and said casing having an open top positioned below the top of said housing to permit water in said housing to overflow into said casing, said casing further including spaced parallel vertically disposed side members and a vertically disposed back member, a pair of urns arranged in said housing on opposite sides of said casing, heating means arranged below said urns, a heating well arranged below the intermediate portion of said platform and having communication with said casing, a vertically disposed tube extending through said casing and having its lower end communicating with said heating well, a ball valve mechanism arranged in said heating well, said ball valve mechanism controlling the flow of water from said heating well into said tube, a heater connected to said heating well, a coffee holding container supported by the upper portion of said housing and communicating with the upper end of said tube, conduit means connecting said container to said urns, a solenoid valve arranged below said platform and adapted to be connected to a source of supply of water, a conduit connecting said solenoid valve to the interior of said housing, float responsive switch means mounted in said casing and operatably controlling said solenoid valve, manually operable switch means connected to said heater means and circuits operatively connecting said solenoid to said switch means so that the movement of said switch means will energize or de-energize said solenoid.

References Cited in the file of this patent

UNITED STATES PATENTS

| | | |
|---|---|---|
| 956,481 | Chapman | Apr. 26, 1910 |
| 1,475,334 | Warner | Nov. 27, 1923 |
| 2,016,281 | Harper et al. | Oct. 8, 1935 |
| 2,247,226 | Ehrenreich | June 24, 1941 |
| 2,568,840 | Zees | Sept. 25, 1951 |
| 2,630,061 | Sharaf | Mar. 3, 1953 |
| 2,655,859 | Bell | Oct. 20, 1953 |
| 2,666,379 | Kaminky | Jan. 19, 1954 |
| 2,706,444 | Chaplik | Apr. 19, 1955 |
| 2,786,408 | Herrera | Mar. 26, 1957 |

FOREIGN PATENTS

| | | |
|---|---|---|
| 447,274 | France | Oct. 23, 1912 |
| 505,764 | Belgium | Sept. 29, 1951 |